Dec. 12, 1972 R. M. SWANSON 3,705,959
LINE LOCKOUT CIRCUIT
Filed May 17, 1971
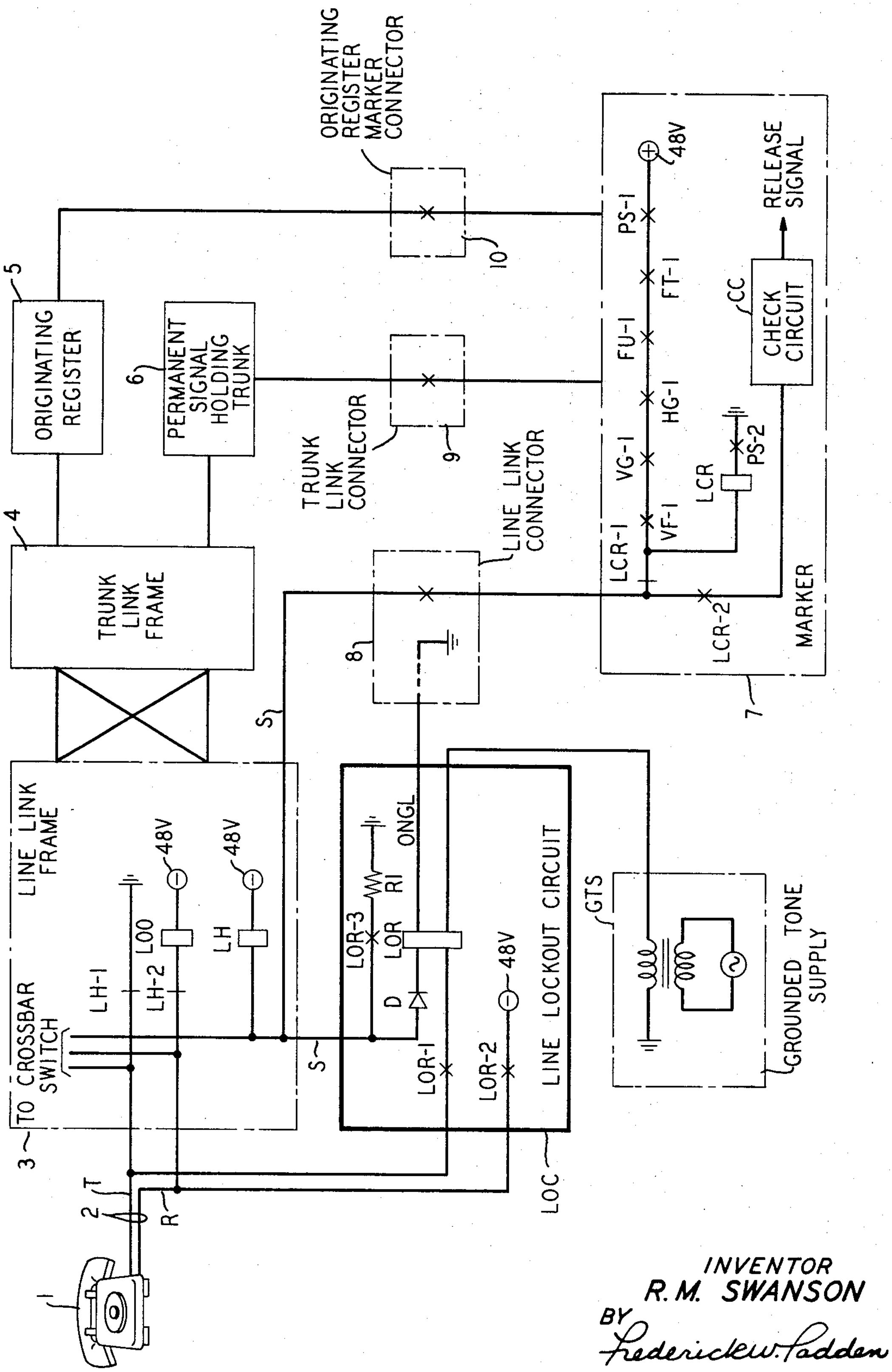
INVENTOR
R. M. SWANSON
BY Frederick W. Padden
ATTORNEY United States Patent Office 3,705,959
Patented Dec. 12, 1972

3,705,959

LINE LOCKOUT CIRCUIT

Richard Maurice Swanson, Holmdel, N.J., assignor to Bell Telephone Laboratories, Incorporated, Murray Hill, N.J.

Filed May 17, 1971, Ser. No. 143,764
Int. Cl. H04m 3/18
U.S. Cl. 179—18 F 4 Claims

ABSTRACT OF THE DISCLOSURE

A station line lockout circuit in a common control telephone system employing a crossbar switching network is disclosed. The circuit comprises a single lockout relay which is bridged onto a station line and is automatically operated by a common control circuit after an originating register timeout occurs due to a permanent signal. The lockout relay cooperates with the common control circuit to activate a crossbar switch line hold magnet for opening the conventional line relay circuit to block the initiation of dial tone service requests until after the permanent signal is cleared. The lockout relay locks operated to the station line, supplies permanent signal tone to the line, and maintains the hold magnet activated after the common control circuits release upon determining that the lockout is effective.

BACKGROUND OF THE INVENTION

This invention relates to communication systems and particularly to permanent signal lockout circuitry for telephone systems.

The volume of permanent signal conditions in telephone systems has increased in recent years to the extent that they have become a burden on system call serving capacity. It has, therefore, become desirable for telephone companies to modify existing switching facilities to reduce call blockage caused by undesired tie-up of network connections on permanent signals.

Prior art circuits are available for eliminating the tie-up of network connections by locking out permanent sigals at the station line circuits. Among the disadvantages of such circuits, however, is that they are frequently costly in part because complex and time consuming manual wiring modifications of line circuits are customarily required to integrate the lockout facilities into the line circuits. In addition, prior art circuits are not operationally suitable for use in certain common control systems. It is apparent, therefore, that a need exists for new and imaginative lockout facilities which reduce call blockage and the need for expensive and time consuming wiring changes in line circuits.

SUMMARY OF THE INVENTION

In accordance with principles of my invention, the foregoing problems are solved and the need is fulfilled by providing exemplary switching facilities which are bridged onto a station line to provide permanent signal lockout without requiring any wiring modifications to its line circuit or undesired tie-up of network connections. Specifically, the exemplary facilities include a single lockout relay which is advantageously bridged onto a station line and is automatically operated by a common control circuit for controlling a line lockout after a permanent signal condition is detected. According to my invention, the lockout is initially established by the common control circuit operation of a crossbar switch hold magnet which is associated with the permanent signaling line. The operated hold magnet opens the conventional tip and ring leads of the line relay circuit to block the initiation of a dial tone service request until after the permanent signal is cleared. In operating, the lockout relay locks operated to the permanent signaling station loop, supplies a permanent signal tone to that loop, and maintains the lockout in effect by holding the crossbar switch hold magnet activated after the common control circuit and other switching circuits release upon a determination that the lockout is effective.

According to my invention, the common control circuit supplies a momentary lockout initiating signal to operate both the lockout relay and the hold magnet. The operated lockout relay then supplies a check signal back to the common control circuit for instructing it that no likage through a switching network is required for connecting the troubled line to a permanent signal holding trunk. Accordingly, upon detecting the check signal the common control circuit immediately releases itself and other switching circuits for serving other calls.

DRAWING DESCRIPTION

A single sheet of drawing discloses a specific illustrative embodiment of a line lockout circuit arrangement according to principles of my invention and is incorporated in a crossbar switching system of a design described in A. J. Busch U.S. Pat. 2,585,904 of Feb. 19, 1952.

DESCRIPTION OF EMBODIMENT

In the drawing, there is shown a customer station 1 connected over line 2 to both a lockout circuit LOC in accordance with my invention and to a switching network comprising a line link frame 3 and a trunk link frame 4 as described in the aforementioned Busch patent. An originating register 5 and a permanent signal holding trunk circuit 6 are terminated conventionally on trunk link frame 4. Interconnections between a customer station 1 and register 5 or trunk 6 are established via the frames 3 and 4 under control of a common control marker circuit 7 cooperating with a line link connector 8, trunk link connector 9 and an originating register marker connector 10.

Customer station 1 is equipped for lockout service on permanent signal conditions by the simple bridging of the lockout circuit LOC across tip, ring and sleeve conductors T, R and S of the station line 2 appearance on the line link frame 3. Advantageously, the bridging characteristics of my invention eliminate the prior art need for taking a station temporarily out-of-service while wiring changes are made to integrate a lockout arrangement into a station line circuit. My illustrative lockout circuit LOC comprises a single double-wound relay LOR, a diode D and a resistor R1. One terminal of an upper winding of relay LOR is connected through diode D to sleeve lead S for receiving a lockout initiating signal via line link frame 3. Diode D renders relay LOR sensitive only to lockout initiating signals and isolates other sleeve lead control signals from relay LOR. According to my invention, a marker 7 is illustratively arranged to supply the lockout initiating signal to lead S via frame 3 and link connector 8 when it is determined that a permanent signal exists on line 2 as hereinafter described. Another terminal of the upper winding of relay LOR is connected to conductor ONGL from line link connector 8 and for receiving an "off-normal" ground concurrently with the application of the lockout initiation signal to lead S. My illustrative lockout circuit advantageously presents an open circuit termination impedance across the tip and ring leads T and R at all times other than for a lockout and therefore virtually does not impair call transmission over leads T and R.

A permanent signal condition which results in the operation of my illustrative lockout circuit commences with an off-hook signal on a station line 2. The actual circumstances under which that signal occurs for a permanent signal are not important for fully understanding my invention, but it may be due, for example, to an unintentional or deliberate subset off-hook, or a false cross or ground on a station line, or a call processing irregularity. Referring to the drawing, an off-hook signal on station line 2 causes a conventional loop closure across conductors T and R for completing an obvious path for operating a conventional service request detecting line relay LOO via off-normal break contacts LH–1 and LH–2 of a crossbar switch hold magnet LH on line link frame 3. Line relay LOO and its associated circuitry correspond to the line relay arrangements disclosed in FIG. 5 of the Busch patent. In operating, relay LOO initiates circuit actions as described in the Busch patent column 6, line 46 et seq. whereby station 1 is connected to an originating register 5 via frames 3 and 4 and under control of marker 7. During the completion of the register 5 to station 1 connections, marker 7 controls the operation of hold magnet LH as described in Busch and thereby the opening of the operate path for relay LOO at contacts LH–1 and LH–2. Concurrently, marker 7 passes the calling line designation line (equipment location, class-of-service, etc.) to register 5 for storage and, after checking the integrity of the established connections, marker 7 releases itself for serving other calls. Register 5 next returns dial tone to station 1 in a manner as described in the Busch patent and as a signal to begin dialing a called number.

For permanent signal causing conditions, a called number is not, of course, received in register 5. As a result, register 5 times-out in a well known manner and then reengages marker 7 via an originating register marker connector 10 for informing it of the permanent signal in a manner as described in the Busch patent column 186, line 68 et seq. Marker 7 concurrently receives the calling line designation information for station 1 from register 5 and thereafter controls the release of the register 5 to line 2 connections via frames 3 and 4. In the release of the latter connections, hold magnet LH releases to reclose its contacts LH–1 and LH–2 for reoperating line relay LOO. Next, marker 7, in a manner as described in the Busch patent column 187, line 27 et seq., proceeds to select a permanent signal holding trunk 6 and to test and select available connections through frames 3 and 4 between line 2 and trunk 6.

The use of my illustrative line lockout arrangements alter the operation of the Busch switching system by eliminating the need for completing connections through frames 3 and 4 between the selected trunk 6 and line 2 and for then holding those connections during the persistence of the permanent signal holding condition. Specifically, after the Busch system effects the release of the originating register 5 to station 1 connections through frames 3 and 4 as priorly stated, marker 7 advantageously activates my illustrative line lockout circuit LOC for applying the lockout and then checks to insure that the lockout is effective.

To activate lockout circuit LOC, marker 7 acquires a connection to sleeve lead S via connector 8 by utilizing the information which it receives from the originating register 5 as described in the Busch patent column 186, line 58 et seq. The information pertains to the permanent signal and the calling line designation (line equipment location, class-of-service and the like). Marker 7 automatically registers that permanent signal condition on a relay PS and the calling line designation on its relays FT-(line frame tens), FU-(frame units), HG-(horizontal group), VG-(vertical group), and VF-(vertical file) as disclosed in the Busch patent. According to my illustrative invention, contacts of the latter relays in combination with another lockout control relay LCR uniquely enable marker 7 to establish a connection to lead S for applying the lockout initiating signal thereto. To elaborate, the latter signal, +48 volts, is applied through contacts PS–1, FT–1, FU–1, HG–1, VG–1, VF–1 and LCR–1 and connector 8 to lead S. At the same time, an obvious circuit is extended for operating the slow operate relay LCR via contact PS–2 to ground. After a delay period sufficient to allow hold magnet LH and relay LOR to operate, relay LCR operates and removes at its contact LCR–1 the momentary +48 volts on lead S. At about the same time, relay LCR transfers lead S via its contact LCR–2 to a check circuit CC which detects a permanent signal resistance ground check signal applied to lead S when the line lockout is effective, as hereinafter explained. Upon detecting that signal, circuit CC supplies marker 7 with a release signal which causes marker 7 to release, in a known manner, the selected holding trunk 6 and itself for serving other calls and advantageously without establishing linkage through frames 3 and 4.

The +48 volts on lead S reactuates the crossbar switch hold magnet LH over the obvious path through its energizing winding to −48 volts. Thereafter, magnet LH locks actuated when relay LOR operates, as later described, and applies a locking ground through resistor R1 and contact LOR–3 to lead S. Upon the actuation of magnet LH, its contacts LH–1 and LH–2 open the tip and ring path to effect the release of line relay LOO and to preclude its further operation until after the permanent signal condition is removed from line 2. At the time that magnet LH is reactuated, no associated select magnet (not shown) of the same crossbar switch of frame 3 is actuated. Consequently, the actuated magnet LH does not establish any linkage from line 2 through frame 3. Accordingly, dial tone service requests from the line 2 are now locked out for the duration of the permanent signal and without holding link connections through frames 3 and 4 out-of-service during the persistence of the permanent signal.

When the momentary +48 volts is applied to lead S, it also causes the operation of relay LOR. In operating, relay LOR maintains the line lockout effective by locking magnet LH actuated. The operation of relay LOR also supplies a lockout check signal over lead S to the marker 7 for enabling it to release the selected permanent signal holding trunk and itself for serving other calls instead of completing connections from line 2 through frames 3 and 4 to a permanent signal holding trunk. Relay LOR operates from the +48 volts on lead S through diode D and the upper winding of relay LOR to the "off normal" ground on lead ONGL. In operating, relay LOR locks itself operated by completing a path through its lower winding from a conventional grounded permanent signal tone supply GTS, contact LOR–1, lead T, the station loop, lead R, and contact LOR–2 to −48 volts. Relay LOR thus remains operated and supplies the permanent signal tone from supply GTS to line 2 until the permanent signal causing off-hook signal is withdrawn from line 2. Upon operating, relay LOR also applies a permanent signal resistance ground to lead S via resistor R1 and contact LOR–3 to lead S as a check signal to marker 7 that the lockout is effective. Marker 7 then detects the check signal in a routine manner and releases the selected holding trunk 6 and itself to serve other calls.

It is advantageous at this point to recognize that every telephone line need not be equipped with a line lockout circuit. In such a case, the marker 7 does not detect a resistance ground check signal on the sleeve lead of the unequipped line and therefore routinely connects that permanent signaling line to a selected permanent signal holding trunk in a manner as described in the Busch patent column 186, line 58 et seq.

It is also to be understood that the above described arrangements are illustrative of the application of principles of my invention. Numerous other arrangements may be devised by those skilled in the art without departing from the spirit and scope of my invention.

What is claimed is:

1. A line lockout arrangement for a crossbar switching system comprising a communication line, a service request detector, a crossbar switch line hold magnet and switch contacts for connecting said line to said service request detector to detect service requests,
means responsive to a permanent signal condition on said line for operating said hold magnet,
and said switch contacts to disconnect said communication line from said service request detector to lockout service requests therefrom, and
lockout control means connected to said line and responsive to said permanent signal condition for maintaining said hold magnet actuated under control of said permanent signal condition on said line.

2. The invention of claim 1 wherein
said communication line comprises a tip, a ring and a sleeve conductor,
said arrangement further includes means for generating a momentary lockout signal responsive to said permanent signal condition,
said lockout control means includes a semiconductor device and a lockout relay comprisnig a first and a second winding each of which has two terminals,
said first winding having a first terminal connectable to a first potential and a second terminal connected in series with said semiconductor device to said sleeve conductor, said relay being operated by the application of said momentary lockout signal to said sleeve conductor and said first winding,
said relay having a plurality of relay contacts actuated upon the operation of said relay,
a tone supply is serially connected with a second potential to a first terminal of said second winding, a second terminal of said second winding being serially connected with said actuated relay contacts, a third potential and said tip and ring conductors for holding said relay operated under control of said permanent signal condition on said line.

3. The invention of claim 2 wherein
said service request detector comprises a line relay connectable to said tip and said ring conductor,
said switch contacts comprise off-normal contacts of said hold magnet serially connecting said line relay to said tip and said ring conductor,
said hold magnet comprises an actuating winding connected to said sleeve conductor and being actuated by said momentary lockout signal for activating said switch contacts to disconnect said line relay from said tip and said ring conductor and thereby to lockout service requests from said line during said permanent signal condition, and
said lockout relay having another relay contact responsive to the operation of said lockout relay for connecting another signal to said sleeve conductor for maintaining said hold magnet actuated during said permanent signal condition.

4. A line lockout circuit for a marker-controlled crossbar switching system having a line, a crossbar switch, a line relay for initiating a service request to cause said crossbar switch to establish connections to said line, crossbar switch cutoff contacts for disconnecting said line relay from said line when said connections are established, and marker means for generating a lockout signal when said line exhibits a permanent signal condition, said marker means causing said crossbar switch to drop said connections and reconnect said line relay to said line responsive to said permanent signal condition,
said line lockout circuit comprising:
an auxiliary operating path for said crossbar switch and said crossbar switch cutoff contacts,
a lockout relay having first and second contacts, an operating and a holding winding, said first contacts being operable to complete said auxiliary operating path, and
means for energizing said operating winding responsive to the appearance of said lockout signal,
said second contacts of said energized lockout relay being operable to connect said holding winding to said line for holding said relay operated under control of said permanent signal condition.

References Cited

UNITED STATES PATENTS

| | | | |
|---|---|---|---|
| 3,378,642 | 4/1968 | Gagnier et al. | 179—18 F |
| 2,913,529 | 11/1959 | Jacobaeus et al. | 179—18 F |

THOMAS W. BROWN, Primary Examiner

U.S. Cl. X.R.

179—22